US005848779A

United States Patent [19]

Mürbe et al.

[11] Patent Number: 5,848,779

[45] Date of Patent: Dec. 15, 1998

[54] SERVOMOTOR, PARTICULARLY FOR A QUICK-ACTION STOP VALVE

[75] Inventors: Dieter Mürbe, Dresden; Matthias Hartmann, Görlitz; Hans-Frieder Schneider, Dresden, all of Germany

[73] Assignee: Siemens Aktiengesellschaft, Munich, Germany

[21] Appl. No.: 639,955

[22] Filed: Apr. 29, 1996

Related U.S. Application Data

[63] Continuation-in-part of PCT/DE94/01228 Oct. 17, 1994 published as WO95/12057 May 4, 1995.

[30] Foreign Application Priority Data

Oct. 29, 1993 [DE] Germany .......................... 43 37 113.2

[51] Int. Cl.[6] .................................................. F16K 31/124

[52] U.S. Cl. ................................ 251/29; 91/442; 91/468; 91/DIG. 3; 251/44; 251/63.5; 251/63.6

[58] Field of Search ................................ 251/25, 28, 43, 251/44, 63, 63.5, 63.6, 29; 91/442, 468, DIG. 3

[56] References Cited

U.S. PATENT DOCUMENTS

| | | | |
|---|---|---|---|
| 1,767,037 | 6/1930 | Anderson | 251/29 |
| 2,758,811 | 8/1956 | Peterson | 251/29 |
| 2,840,104 | 6/1958 | Shafer | 251/29 |
| 2,914,079 | 11/1959 | Hertrich | 251/29 |
| 3,593,959 | 7/1971 | Greene | 251/63.6 |
| 3,687,017 | 8/1972 | Lewis et al. | 251/63.6 |
| 3,811,279 | 5/1974 | Vogeli | 251/63.5 |
| 4,007,906 | 2/1977 | Karpenko | 251/29 |
| 4,096,881 | 6/1978 | Schabert et al. | 251/25 |
| 4,103,863 | 8/1978 | Houlgrave et al. | 251/63.5 |
| 4,585,207 | 4/1986 | Shelton | 251/63 |
| 4,878,647 | 11/1989 | Putt | 251/29 |
| 5,271,598 | 12/1993 | Hohenshil et al. | 251/29 |

*Primary Examiner*—George L. Walton
*Attorney, Agent, or Firm*—Herbert L. Lerner; Laurence A. Greenberg

[57] ABSTRACT

A controlling motor for moving a stem along an axis has a hydraulic actuator with a cylinder in which a piston that is frictionally linked to the stem is slidingly and sealingly mounted, as well as a compression spring that is frictionally linked to the stem and acts against the actuator. The controlling motor has a trigger with an inflow area into which hydraulic fluid may be introduced, a pressure area that communicates with the inflow area through a diaphragm and is connected to the actuator, and a drainage area from which the hydraulic fluid may be evacuated without pressure, as well as a switching element that links the pressure area to the drainage area when a positive pressure differential occurs between the pressure area and the inflow area, and that otherwise shuts off the drainage area. The stem may be pushed out of the cylinder by the compression spring and may be drawn into the cylinder when hydraulic fluid is applied to the inflow area. This controlling motor is particularly suitable for driving a rising stem quick-action stop valve, such as those often used for example in steam power stations.

11 Claims, 2 Drawing Sheets

SERVOMOTOR, PARTICULARLY FOR A QUICK-ACTION STOP VALVE

CONTINUATION STATEMENT

This application is a continuation of International Application Number PCT/DE94/01228 filed on 17 Oct. 1994, published as WO95/12057 May 4, 1995.

FIELD OF THE INVENTION

The invention relates to a servomotor for displacing a stem along an axis, comprising a hydraulic actuator and a trigger structurally combined therewith which is able to be subjected to a hydraulic fluid and which is connected to the actuator through the hydraulic fluid, a) said actuator having a cylinder in which a piston frictionally linked to said stem is slidingly and sealingly supported, and a compression spring frictionally linked to the stem and acting against the actuator, said stem being able to be pushed out of said cylinder by said compression spring and to be drawn into said cylinder upon subjecting said actuator to the hydraulic fluid;

b) said trigger comprising an inflow area being able to be subjected to the hydraulic fluid, a pressure area to which said actuator is connected, an orifice through which the inflow area is connected to the pressure area, a drainage area from which the hydraulic fluid is able to be evacuated in a depressurized way, as well as a switching element connecting said pressure area to the drainage area when a positive pressure differential between the pressure area and the inflow area occurs and which in any other case shuts off the drainage area.

Such a servomotor is described in EP 0 430 089 A1.

The invention particularly relates to a servomotor for a quick-action stop valve such as one used for a steam turbine for which a quick shut down procedure must be provided. This is the case, practically, for any steam turbine which drives a generator of electrical power in a power station or an industrial plant. Commonly, a steam turbine driving a compressor or the like in a chemical plant must also be equipped with such a quick-action stop valve including the associated servomotor.

BACKGROUND OF THE INVENTION

In the DD 263 801 A1 a servomotor of the kind described in the introductory part of the application for a quick-action stop valve is disclosed. For this quick-action stop valve the pressure area is provided by an area of the cylinder separated by the piston frictionally linked to the stem and slidingly supported in the cylinder, as well as by a pipe socket leading to the switching element formed as a plate. The plate is pressed onto the pipe socket by a compression spring and substantially seals the pipe socket.

In the plate an orifice is provided through which the supply area arranged above the plate communicates with the pressure area arranged below the plate. An external pipe socket encircling the pipe socket already mentioned surrounds the circular drainage area through which hydraulic fluid can be drained off when the plate is raised by the hydraulic fluid from the pressure area, a condition that occurs when the pressure of the hydraulic fluid in the inflow area decreases and the pressure differential from the pressure area to the inflow area increases.

The servomotor according to the DD 263 801 A1 is distinguished by the fact that it can be operated from a single supply system for the hydraulic fluid. If the quick-action stop valve onto which the servomotor is connected is to be opened it is sufficient to supply hydraulic fluid to the inflow area and hence to build up a pressure in the inflow area. This pressure presses the plate onto the pipe socket and prevents the hydraulic fluid from draining off into the drainage area; the hydraulic fluid passes through the orifice in the plate into the pressure area and there causes a gradual pressure build up. The piston which is pressed into an initial position by an appropriate compression spring, is displaced into an end position and opens the quick-action stop valve. For triggering the quick-action, it is sufficient to let the pressure in the supply system decrease by a sufficient amount; in this case the plate lifts off from the pipe socket and exposes the drainage area thus enabling the hydraulic fluid to drain off in an unpressurized way and to cause a return motion of the piston to the initial position by the force of the compression spring. Furthermore, the servomotor is provided for operating a so-called pushing-action valve, that means a valve having an angular valve seat and a valve cone mating therewith which is secured to a spindle on a side facing towards the valve seat, said spindle protruding through the valve seat. The servomotor must be connected to the spindle so that the valve seat is located between the valve cone and the servomotor.

The servomotor is unsuitable for operating a so-called pulling-action valve, which also comprises an angular valve seat with a mating valve cone on a spindle. However, the spindle does not protrude through the valve seat but is connected thereto on a side of the valve cone opposite to the valve seat. A servomotor is to connected to the spindle so that the valve cone is located between the valve seat and the servomotor.

A pulling-action valve enables the spindle to be kept away from fluid flowing through the opened valve. In the case of a pushing-action valve, this is not possible because the spindle always protrudes through the valve seat through which the fluid flows. Therefore, a pulling-action valve offers an operational advantage as compared with a pushing-action valve.

SUMMARY OF THE INVENTION

It is an object of the invention to provide an improved servomotor of the kind mentioned in the introductory part of the application which is particularly suited for a connection to a so-called pulling quick-action stop valve.

This object is achieved by a servomotor for displacing a stem along an axis comprising a hydraulic actuator and a trigger structurally combined therewith which is able to be subjected to a hydraulic fluid and which is connected to the actuator through the hydraulic fluid, a) the actuator comprising a cylinder in which a piston frictionally linked to this stem is slidingly and sealingly supported, and a compression spring frictionally connected to the stem and counteracting the actuator, said stem being able to be pushed out of the cylinder by the compression spring and to be drawn into the cylinder by subjecting the actuator to the hydraulic fluid;

b) said trigger comprising an inflow area being able to be subjected to the hydraulic fluid, a pressure area to which the actuator is connected, an orifice through which the inflow area is connected to the pressure area, a drainage area from which the hydraulic fluid is able to be drained off in an unpressurized way, as well as a switching element connecting the pressure area to the drainage area when a positive pressure differential from the pressure area to the inflow area occurs, and otherwise shuts off the drainage area;

c) said trigger being arranged behind the actuator as viewed from the stem along the axis; and d) said piston defining a power chamber being able to be subjected to hydraulic fluid between itself and an end wall of the cylinder through which the stem is guided and towards which it is pressed by the compression spring, and comprising at least one hole by means of which the chamber is connected to the pressure area.

Such a servomotor can be embodied as a compact and substantially cylindrical unit. Additionally, the arrangement of the trigger behind the actuator is advantageous with regard to the efficiency of the servomotor particularly regarding the speed achievable of a quick-action.

This servomotor particularly includes the advantages of a prior art servomotor for a pushing-action valve. The inventive servomotor is relatively simple to operate because it requires only a single supply system for hydraulic fluid and it facilitates the use with a pulling quick-action stop valve. A quick-action stop valve comprises a closing element which is drawn by a valve spindle in order to open the valve. Such a quick-action stop valve has the advantage that during normal operation, when the fluid such as steam flows through the quick-action stop valve, the valve spindle serving to draw-open the closing element need not be directly exposed to the fluid. Therefore, the danger of damage due to corrosion, erosion or deposits exists to an extent substantially smaller than in case of a pushing quick-action stop valve. Furthermore, a flow obstacle, namely the valve spindle protruding into the quick-action stop valve, is avoided.

Preferably, the switching element in the servomotor is a plate located in the inflow area which sealingly rests on two pipe sockets which delimit the pressure area and the drainage area.

Advantageously, this plate includes an orifice in the shape of a small hole. Within the frame work of this embodiment, a particularly compact form of the trigger is achieved. Preferably, the plate is pressed onto the pipe sockets by a further compression spring and hence enables the trigger to be located in any spatial position.

Preferably, the communication between the power chamber and the pressure area is designed to be a variable length pipe connection. Such a pipe connection is particularly formed with two sealingly telescoped pipe sockets, one of the pipe sockets being connected with the stationary trigger and another pipe socket being connected to the movable piston. Preferably, the mentioned plate, as a switching element, rests on the pipe socket connected to the trigger.

The compression spring pressing the piston is preferably located in the drainage area. In this way, it is wetted during operation by the hydraulic fluid so that, to a certain extent, it is protected against corrosion. Additionally, this arrangement serves the compactness of the servomotor.

According to a further preferred embodiment, the piston comprises a protrusion, which protrudes into the power chamber and which is able to plunge into a respective recess of the end wall, leaving a gap between. This embodiment, which is particularly related to the piston, can of course be combined with embodiments of the servomotor already mentioned. The embodiment just described enables the piston upon triggering the servomotor, to be retarded shortly before reaching the initial position. The piston is retarded, upon plunging the projection of the piston into the recess of the end wall, because the power chamber is divided into two chambers, one within the recess and one without, which only communicate with each other by the gap between the protrusion and the recess. Therefore, hydraulic fluid must drain from the outside chamber through the gap into the chamber within the recess. The hydraulic fluid flow is regulated according to the size of this gap and the associated flow resistance which the gap imparts on the hydraulic fluid. In such a way the retarding of the piston shortly before reaching its initial position is realized which represents a significant contribution to avoiding damages on the servomotor itself and on a valve or the like to which the servomotor is connected. The effect described is, in particular, achieved where the piston comprises at least one hole which passes through the protrusion and through which the power chamber communicates with the pressure area of the trigger. Thus, upon triggering, the hydraulic fluid drains from the power chamber at least partially through the gap and provides the desired retarding effect.

The servomotor of any embodiment is suited particularly for driving a valve, particularly a quick-action stop valve.

The servomotor of any embodiment is particularly used for generating a quick closure in a valve, particularly a quick-action stop valve for a steam power plant.

It should be noted that the inventive arrangement of the servomotor having a trigger is by no means limited to servomotors which are exclusively used for driving quick-action stop valves. Therefore, a means for continuous and controlled displacement of the stem, apart from performing a quick closure by means of the trigger, is be no means excluded.

DETAILED DESCRIPTION OF THE INVENTION

Figure 1:
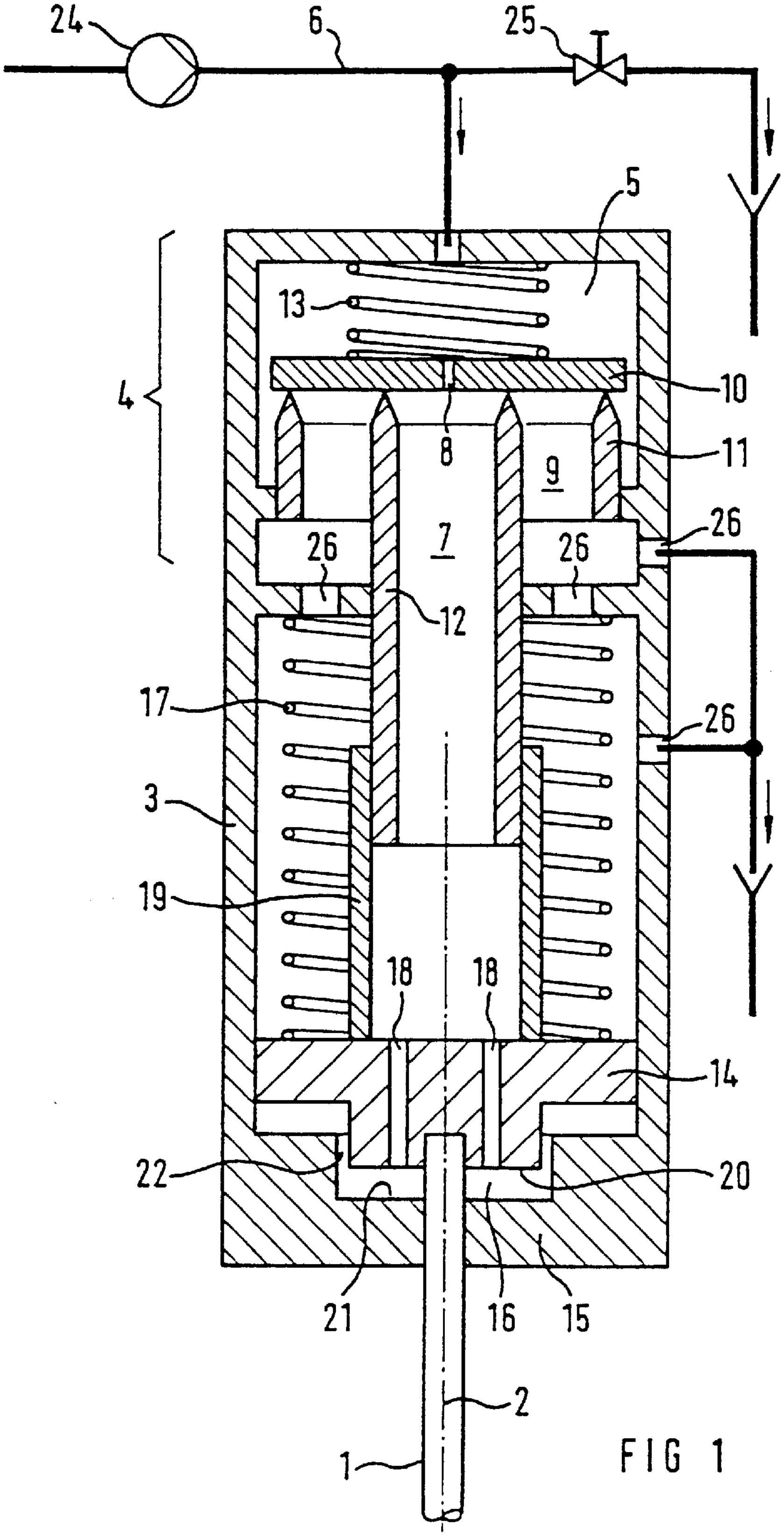
FIG. 1 is a diagrammatic, sectional view of a servomotor according to the invention.

Embodiments of the invention are now explained in more detail referring to the drawing. The drawing each shows only such components of the respective embodiment which are essential for the explanation; for simplicity reasons components which are not absolutely relevant in the present connection are not represented. Particularly, necessary fastening means such as screws have not been shown. It is understood that when realizing the invention such components are within the ordinary skill of the person skilled in the art. Furthermore, it is by no means claimed that the drawing is to scale for a specific embodiment.

FIG. 1 shows a servomotor for displacing a stem 1 along an axis 2, said stem 1 projecting out of an end wall 15 of a cylinder 3. By means of the force of a compression spring 17 acting on a piston 14, movably supported in said cylinder 3 and connected to the stem 1, the stem 1 is able to be pushed out of the cylinder 3. The stem 1 may be pulled into the cylinder 3 by subjecting the hydraulic actuator formed by the cylinder 3 and the piston 14 to hydraulic fluid, particularly hydraulic oil. For this purpose, a power chamber 16 which is variable in size and delimited against other areas of the cylinder 3 by the piston 14, is provided between the piston 14 and the end wall 15. The power chamber 16 is subjected to the hydraulic fluid by means of a trigger 4.

The trigger 4 is located behind the actuator 3, 14 as seen from the stem 1 along the axis 2. The trigger 4 comprises an inflow area 5 which is supplied with hydraulic fluid from a supply system 6. A hydraulic pump 24 and a control valve 25 are represented in order to illustrate the function of this supply system 6. The hydraulic pump 24 can subject the hydraulic fluid in the supply system 6 to a certain pressure. The hydraulic fluid can, if appropriate, drain from the supply system 6 through the control valve 25 and, by this means, the pressure in the supply system 6 can be reduced. In order to supply hydraulic fluid, the control valve 25 is closed so that pressure can build up in the inflow area 5. By means of this pressure a switching element 10 of the trigger 4, namely a plate 10, is pressed onto two pipe sockets 11 and 12 which are concentric to each other. The internal pipe socket 12 forms the pressure area 7 in its inner region which communicates with the inflow area 5 by means of an orifice 8, namely a hole 8 in the plate 10. When pressure builds in the inflow area 5, a corresponding pressure builds up in the pressure area 7. A drainage area 9 from which hydraulic fluid can be drained off in an unpressurized way is situated between the internal pipe socket 12 and the external pipe socket 11. For this purpose, drainage holes 26 are provided, for which several possibilities are represented in FIG. 1. A further compression spring 13 presses the plate 10 onto the pipe sockets 11 and 12, thereby ensuring that seals which are not represented usually are effective between the two pipe sockets 11 and 12 and the plate 10. The further compression spring 13 can be designed such that an operation of the servomotor is possible in any spatial position. Also shown in FIG. 1 is pipe socket 19, which is secured to the piston 14 and slides on the exterior of pipe socket 12. Hydraulic fluid may therefore flow from the supply area 5 into the pressure area 7, through the interiors of pipe socket 12 and pipe socket 19, and into the power chamber 16 through holes 18 situated in the piston 14. As hydraulic fluid enters the power chamber 16, the piston 14 is pushed away from the end wall 15 against the force of the compression spring 17, which rests on the cylinder 3, and hence pulls the stem 1 into the cylinder 3. For a quick-action stop valve, the pressure to be built up in the power chamber 16 is to be designed such that the piston 14 reaches a predetermined end position. This end position is maintained by the piston 14 as long as the pressure in the inflow area 5 remains sufficiently constant.

When the pressure in the inflow area 5 decreases a positive pressure differential from the pressure area 7 to the inflow area 5 builds up because of the relatively high flow resistance of the orifice 8. When the pressure differential becomes sufficiently high because of decreased pressure in the inflow area 5, plate 10 will lift away from the pipe sockets 11 and 12 against the force of the further compression spring 13 (or if the further compression spring 13 is not present, against the gravity acting on the plate 10). When the plate 10 lifts away, the seal is broken between plate 10 and pipe sockets 11 and 12 which enables communication between the pressure area 7 and the drainage area 9. Communication between the inflow area 5 and the drainage area 9, which is also enabled by the lifting off of plate 10, is of less significance. At all events, when the plate 10 is lifted, the compression spring 17 is able to push the piston 14 again to the end wall 15 to the initial position. The hydraulic fluid is conveyed through the holes 18 and the pipe sockets 19 and 12 to the drainage area 9. The transfer of hydraulic fluid results in movement of the piston 14 towards the end wall 15, so that the stem 1 is likewise suddenly pushed out of the cylinder 3. In this way, a quick-action stop valve or the like can be closed as quickly as possible. This process is referred to as "triggering" the trigger.

In FIG. 1, there is also represented a certain embodiment of the piston 14 and the end wall 15 which permits a retardation of the sudden movement of the piston 14 upon triggering by the trigger 4. The piston 14 comprises a protrusion 20 projecting towards the end wall 15 and being able to plunge into a corresponding recess 21 in the end wall 15, leaving a relative narrow gap 22 between. If this occurs, the drainage of the hydraulic fluid is retarded because of the increased flow resistance of the fluid through the gap 22. The sudden movement of the piston 14 is thereby retarded or compensated shortly before reaching the end wall 15.

Figure 2:
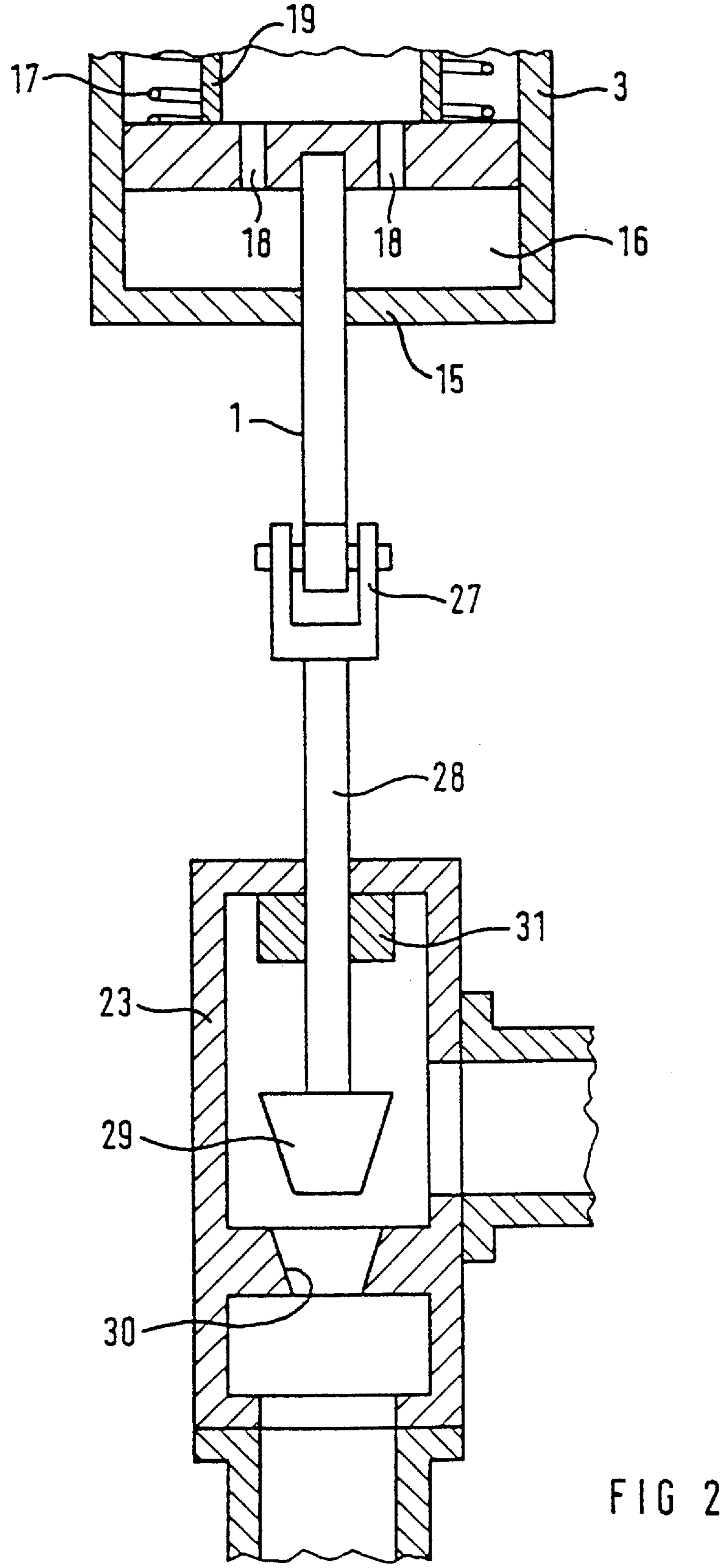
FIG. 2 is a fragmentary, sectional view showing a connection of the servomotor to a valve.

FIG. 2 shows how a servomotor can be connected to a pulling-action valve 23. Means which support the cylinder 3 of the servomotor against the quick-action stop valve 23 are not shown because such means are generally known to persons skilled in the art. Certain details of the servomotor represented in partial views correspond to the details shown in FIG. 1 are provided identical reference numerals so that no further explanation is required. The stem 1 of the servomotor is connected to a valve spindle 28 of the quick-action stop valve 23 through a coupling 27. The valve spindle 28 protrudes into the quick-action stop valve 23 and carries at its end a valve cone 29. The valve cone 29 may fit into and close a corresponding valve opening 30. If the quick-action stop valve 23 is fully opened, which is usually the case, the valve cone 29 is seated on a support 31. The support 31 prevents the valve spindle 28 from direct contact with the fluid, particularly steam, which passes through the quick-action stop valve 23. In addition thereto, the fluid does not flow directly around the valve cone 29 and hence if at all causes a small flow resistance that is favorable in view of avoiding losses.

We claim:

1. Servomotor for displacing a stem between first and second operating positions along an axis, the servomotor comprising: a hydraulic actuator and a hydraulic trigger structurally combined and hydraulically connected to said actuator, a) said actuator comprising a cylinder in which a piston frictionally linked to said stem is slidingly and sealingly supported, and a compression spring that is frictionally linked to the stem to counteract said actuator;

b) said trigger comprising an inflow area subjectable to hydraulic fluid, a pressure area in hydraulic communication with said actuator, an orifice through which said inflow area and said pressure area hydraulically communicate, a drainage area for draining hydraulic fluid, and a switching element which hydraulically connects the pressure area to the drainage area when a hydraulic pressure in the pressure area becomes greater than a hydraulic pressure in the inflow area and hydraulically disconnects the pressure area from the drainage area when the hydraulic pressure in the pressure area becomes equal to the hydraulic pressure in the inflow area, wherein said pressure area is defined by first and second telescoped pipe sockets, the actuator and the switching element, wherein the first telescoped pipe socket is connected to said actuator and wherein said switching element sealingly rests upon an end of the second telescoped pipe socket; and c) wherein said piston of said actuator, a side wall of said cylinder of said actuator and an end wall of said cylinder of said actuator define a power chamber, wherein said stem is guided by and extends through said end wall of said cylinder, wherein said piston of said actuator comprises at least one hole through which the power chamber and the pressure area hydraulically communicate, wherein said stem is pushable out of said cylinder by said compression spring to one of said first and second operating positions when hydraulic fluid flows from the power chamber through the pressure area into the drainage area and wherein said stem is pullable into said cylinder to the other of said first and second operating positions by subjecting the actuator to hydraulic fluid when hydraulic fluid flows from the pressure area to the power chamber.

2. Servomotor according to claim 1, wherein the switching element comprises a plate arranged in the inflow area, which sealingly rests on two pipe sockets which define the pressure area and the drainage area.

3. Servomotor according to claim 2, wherein the plate comprises said orifice.

4. Servomotor according to claim 2, wherein the plate is pressed onto said pipe sockets by a further compression spring.

5. Servomotor according to claim 1, wherein the compression spring is located in said drainage area.

6. Servomotor according to claim 1, wherein said piston of said actuator comprises a protrusion which protrudes into the power chamber, wherein said end wall comprises a recess, wherein a gap exists between the protrusion and the recess when the protrusion is inserted into the recess, and wherein fluid flow is restricted through the gap as fluid flows from a portion of the power chamber outside the recess to a portion of the power chamber inside the recess.

7. Servomotor according to claim 6, wherein said piston comprises at least one hole through which the power chamber the pressure area and which traverses through said protrusion.

8. Servomotor according to claim 1, wherein said servomotor is connected to a valve.

9. Servomotor according to claim 8, wherein said valve comprises a quick-action stop valve.

10. Servomotor according to claim 1, wherein said trigger is positioned along said axis opposite said stem and wherein said actuator is positioned along said axis between said trigger and said stem.

11. Servomotor according to claim 1, wherein said switching element hydraulically disconnects the pressure area from the drainage area when the hydraulic pressure in the pressure area becomes less than the hydraulic pressure in the inflow area.

* * * * *